Patented Sept. 16, 1924.

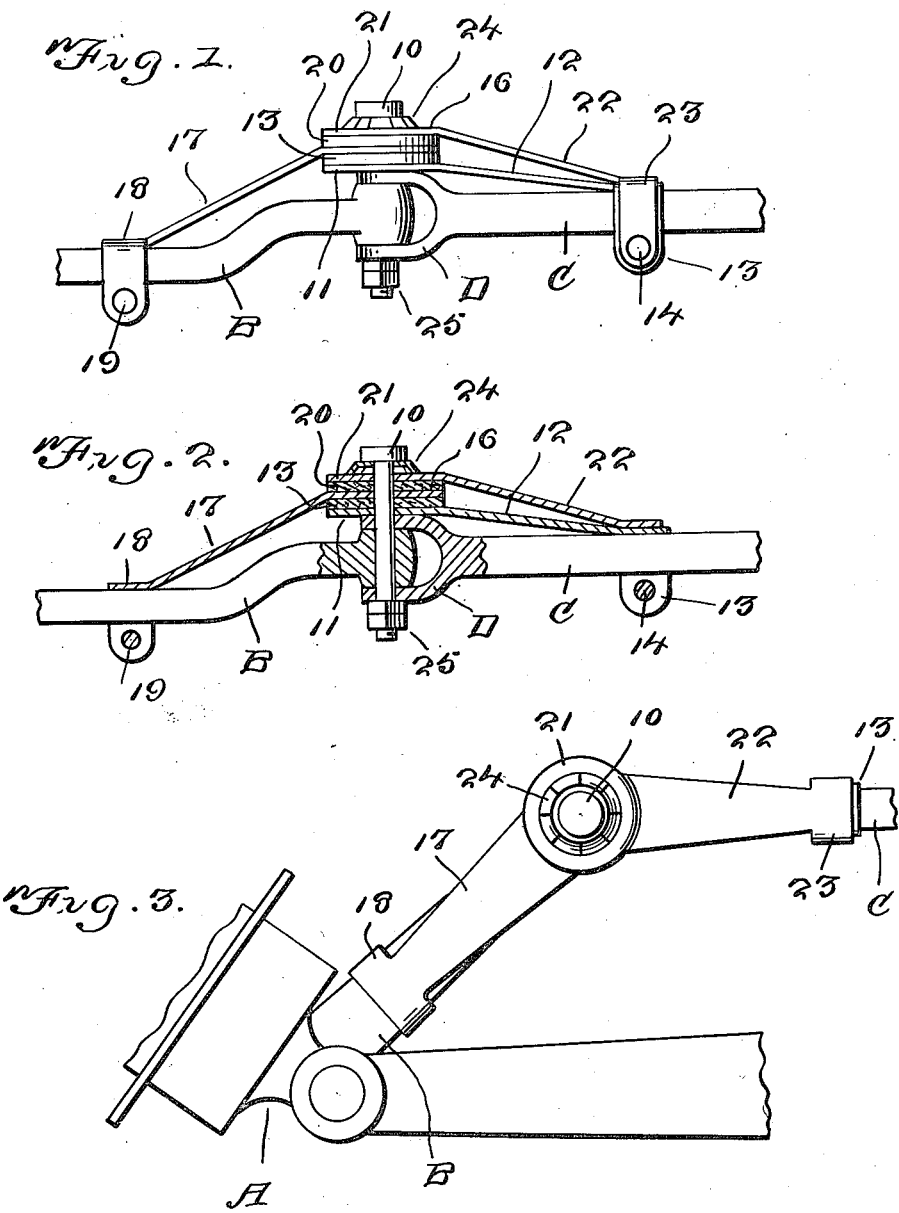

1,509,031

UNITED STATES PATENT OFFICE.

CARL R. SANDSTROM, OF AUSTIN, TEXAS.

JOINT-TIGHTENING DEVICE.

Application filed September 4, 1923. Serial No. 660,844.

*To all whom it may concern:*

Be it known that I, CARL R. SANDSTROM, a citizen of the United States, residing at Austin, in the county of Travis and State of Texas, have invented new and useful Improvements in Joint-Tightening Devices, of which the following is a specification.

This invention relates to attachments or accessories for use on the running gear of automobiles and has for its object the provision of a novel tightening device for taking up play and all looseness in the pivotal connection of the steering arm connecting rod with the spindle arm. It is well known that when this pivotal connection becomes worn, the front wheels of an automobile wabble from side to side especially when passing over unequal surfaces and in addition to this feature there is the disadvantage of the disagreeable rattling.

It is with the above facts in view that I have designed the present device which includes washer members adapted to be engaged with the pivotal connection of the spindle arm with the steering arm connecting rod, certain of these washer members being of a resilient nature and automatically taking up the wear.

An additional object is the provision of tightening means of this character which will be simple and inexpensive in manufacture, easy to install, positive in action, efficient and durable in service and a general improvement in the art.

With the above and other objects and advantages in view the invention consists in the details of construction to be hereinafter more fully described and claimed and illustrated in the accompanying drawings, in which:

Figure 1 is an elevation of a portion of the running gear of an automobile showing a spindle arm and the rod connected therewith and showing the application of my invention, Figure 2 is a section therethrough, Figure 3 is a plan view, The remaining figures are detail views.

Referring more particularly to the drawings the letter A designates the spindle body, B the spindle or steering arm and C the connecting rod which, as is well known, terminates in a fork D straddling the end of the arm B and ordinarily secured thereto by a pivot bolt.

In carrying out my invention I replace the ordinary bolt with a longer bolt 10 and I make use of a plurality of washers and securing members arranged as follows. Disposed upon the top of the fork D is a metallic disk 11 having an elongated extension 12 which terminates in a clip 13 straddling the rod C and secured thereto by a clamping bolt 14. Upon this disk 11 is placed a circular disk 13 of fiber above which is located a second metallic disk 16 which terminates in an extension 17 formed with a U-shaped clip 18 embracing the arm B and clamped thereon by a bolt 19. Arranged upon the top of the disk 16 is a second fiber disk 20 above which is engaged a third metallic disk 21 having an extension 22 overlying the extension 12 and terminating in a clip 23 which is engaged exteriorly upon the clip 13 and clamped by the same bolt 14.

Disposed upon the uppermost metallic member 21 is a spring washer 24 which is located beneath and engaged by the head of the bolt 10. After these parts are applied the bolt passing through all of them, a suitable nut 25 is placed on the bolt and screwed home so as to clamp the various washers and disks firmly in position. The resilience of the washer 24 automatically takes up any looseness which might cause a rattle while the great play and wear are taken care of by the fiber disks 20 and metallic disks engaged therebetween and thereagainst.

From the foregoing description and a study of the drawings it will be apparent that I have thus provided a simple, inexpensive and easily installed means which will be most efficient for effecting tightening of the loose connections, not only at the point specified but at similar and analogous places where the use of equivalent elements is possible.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. Means for tightening the pivotal connection of two elements comprising metallic disks formed with extensions terminating in clips engaged upon said members, a fiber disk disposed between said metallic disks, and a bolt passing through all of the disks and carrying a clamping nut, and a spring washer engaged upon the uppermost metallic disk and engaged beneath the head of the bolt.

2. Means for tightening the pivotal connection of two members, comprising a metallic disk engaged at the joint and terminating in an extension formed with a clip clamped upon one member, a fiber disk upon said metallic disk, a second metallic disk superposed upon said fiber disk and having an extension terminating in a clip engaged upon the other member, a fiber disk disposed upon the second named metallic disk, a third metallic disk engaged upon the second named fiber disk, and a bolt passing through all of said disks and the members for effecting the pivotal connection.

3. Means for tightening the pivotal connection of two members, comprising a metallic disk engaged at the joint and terminating in an extension formed with a clip clamped upon one member, a fiber disk upon said metallic disk, a second metallic disk superposed upon said fiber disk and having an extension terminating in a clip engaged upon the other member, a fiber disk disposed upon the second named metallic disk, a third metallic disk engaged upon the second named fiber disk, and a bolt passing through all of said disks and the members for effecting the pivotal connection, said last named metallic disk having an extension terminating in a clip engaging exteriorly upon the second named clip.

4. Means for tightening the pivotal connection of two members, comprising a metallic disk engaged at the joint and terminating in an extension formed with a clip clamped upon one member, a fiber disk upon said metallic disk, a second metallic disk superposed upon said fiber disk and having an extension terminating in a clip engaged upon the other member, a fiber disk disposed upon the second named metallic disk, a third metallic disk engaged upon the second named fiber disk, and a bolt passing through all of said disks and the members for effecting the pivotal connection, said last named metallic disk having an extension terminating in a clip engaging exteriorly upon the second named clip, and a spring washer on the uppermost metallic disk engaged beneath the head of the bolt.

In testimony whereof I affix my signature.

CARL R. SANDSTROM.